United States Patent
Zangvil et al.

(10) Patent No.: US 11,460,586 B2
(45) Date of Patent: Oct. 4, 2022

(54) SYSTEM AND METHOD FOR IDENTIFYING GLOBAL NAVIGATION SATELLITE SYSTEM SPOOFING ATTACKS ON A PROTECTED VEHICLE

(71) Applicant: Regulus Cyber Ltd., Haifa (IL)

(72) Inventors: Yoav Zangvil, Haifa (IL); Yonatan Zur, Haifa (IL); Gal Cohen, Haifa (IL)

(73) Assignee: Regulus Cyber Ltd., Haifa (IL)

( * ) Notice: Subject to any disclaimer, the term of this patent is extended or adjusted under 35 U.S.C. 154(b) by 65 days.

(21) Appl. No.: 17/082,282

(22) Filed: Oct. 28, 2020

(65) Prior Publication Data

US 2021/0041572 A1 Feb. 11, 2021

Related U.S. Application Data

(63) Continuation of application No. 16/014,243, filed on Jun. 21, 2018, now Pat. No. 10,830,897, which is a continuation of application No. PCT/US2017/050952, filed on Sep. 11, 2017.

(60) Provisional application No. 62/393,677, filed on Sep. 13, 2016.

(51) Int. Cl.
*G01S 19/21* (2010.01)
*G01S 19/36* (2010.01)
*G01S 19/15* (2010.01)

(52) U.S. Cl.
CPC ............ *G01S 19/215* (2013.01); *G01S 19/36* (2013.01); *G01S 19/15* (2013.01)

(58) Field of Classification Search
CPC ......... G01S 19/15; G01S 19/215; G01S 19/36
See application file for complete search history.

(56) References Cited

U.S. PATENT DOCUMENTS

| 7,310,062 | B1 | 12/2007 | Hwang |
| 2005/0212676 | A1 | 9/2005 | Steinberg |
| 2006/0287822 | A1 | 12/2006 | Twitschell, Jr. et al. |
| 2007/0013583 | A1* | 1/2007 | Wang ...................... G01S 19/30 375/150 |
| 2011/0181465 | A1 | 7/2011 | Li et al. |
| 2013/0002477 | A1 | 1/2013 | Dehnie et al. |
| 2013/0106640 | A1 | 5/2013 | Wang et al. |

(Continued)

FOREIGN PATENT DOCUMENTS

| EP | 2796895 | 10/2014 |
| EP | 2455781 | 5/2017 |

(Continued)

OTHER PUBLICATIONS

J.S. Warner et al., GPS spoofing countermeasures, Los Alamos National Laboratory, Los Alamos, NM, LAUR-03-6163, 2003 (Year: 2003).*

(Continued)

*Primary Examiner* — Bernarr E Gregory
*Assistant Examiner* — Fred H Mull

(57) ABSTRACT

A system and method for detecting a global navigation satellite system (GNSS) spoofing attack on a protected vehicle. The method includes receiving at least one GNSS signal; identifying a plurality of characteristics associated with at least one received GNSS signal; analyzing the plurality of characteristics; and determining, based on the analysis of the identified characteristics, whether the at least one GNSS signal is a spoofed signal.

20 Claims, 3 Drawing Sheets

(56) References Cited

U.S. PATENT DOCUMENTS

| | | | |
|---|---|---|---|
| 2014/0035783 | A1 | 2/2014 | Contarino et al. |
| 2014/0266882 | A1 | 9/2014 | Metzger |
| 2014/0368380 | A1 | 12/2014 | Revol et al. |
| 2015/0046017 | A1 | 2/2015 | Torti et al. |
| 2015/0097721 | A1 | 4/2015 | Broussaian |
| 2015/0116147 | A1 | 4/2015 | Jaeckle |
| 2015/0226857 | A1 | 8/2015 | Davies |
| 2015/0226858 | A1 | 8/2015 | Leibner et al. |
| 2016/0370469 | A1* | 12/2016 | Mabuchi ............... G01S 19/215 |
| 2017/0254901 | A1 | 9/2017 | Kim |
| 2018/0239028 | A1 | 8/2018 | Ibendorf et al. |
| 2018/0299560 | A1 | 10/2018 | Zangvil et al. |

FOREIGN PATENT DOCUMENTS

| | | |
|---|---|---|
| EP | 3339905 A1 * | 6/2018 |
| JP | 2000-249754 | 9/2000 |
| JP | 2000-329839 | 11/2000 |
| JP | 2006-217622 | 8/2006 |
| JP | 2008-510138 | 4/2008 |
| JP | 2012-514209 | 6/2012 |
| JP | 2013-518249 | 5/2013 |
| KR | 10-2015-0044447 | 4/2015 |
| WO | WO 2006/085976 | 8/2006 |
| WO | WO 2010/077790 | 7/2010 |
| WO | WO 2013/090568 | 6/2013 |
| WO | WO 2018/125317 | 7/2018 |

OTHER PUBLICATIONS

M.L. Psiaki et al., GNSS Spoofing and Detection, Proceedings of the IEEE, vol. 104, No. 6, Jun. 2016 (Year: 2016).*

Notice of Reason for Rejection dated Mar. 16, 2021 From the Japan Patent Office Re. Application No. 2018-539423. (5 Pages).

Applicant-Initiated Interview Summary dated Jun. 8, 2020 From the US Patent and Trademark Office Re. U.S. Appl. No. 16/014,243. (3 Pages).

International Preliminary Report on Patentability dated Mar. 19, 2019 From the International Bureau of WIPO Re. Application No. PCT/US2017/050952. (4 Pages).

International Search Report and the Written Opinion dated Jun. 21, 2018 From the International Searching Authority Re. Application No. PCT/US2017/050952. (5 Pages).

Official Action dated Jan. 21, 2020 From the US Patent and Trademark Office Re. U.S. Appl. No. 16/014,243. (33 Pages).

Official Action dated Apr. 30, 2020 From the US Patent and Trademark Office Re. U.S. Appl. No. 16/014,243. (17 Pages).

Jafarnia-Jahromi et al. "GPS Vulnerability to Spoofing Threats and a Review of Antispoofing Techniques", International Journal of Navigation and Observation, 2012(Art JD127072), 16 P., 2012.

Notification of Office Action dated Sep. 3, 2021 From the State Intellectual Property Office of the People's Republic of China Re. Application No. 201780010360.1 and Its Partial Translation Into English. (11 Pages).

* cited by examiner

SYSTEM AND METHOD FOR IDENTIFYING GLOBAL NAVIGATION SATELLITE SYSTEM SPOOFING ATTACKS ON A PROTECTED VEHICLE

RELATED APPLICATIONS

This application is a Continuation of U.S. patent application Ser. No. 16/014,243 filed on Jun. 21, 2018, which is a Continuation of PCT Patent Application No. PCT/US2017/050952 having International filing date of Sep. 11, 2017, which claims the benefit of priority of U.S. Provisional Patent Application No. 62/393,677 filed on Sep. 13, 2016. The contents of the above applications are all incorporated by reference as if fully set forth herein in their entirety.

TECHNICAL FIELD

The present disclosure relates generally to the security of unmanned aerial vehicles, and more specifically to the identification of global navigation satellite system (GNSS) spoofing attacks on unmanned aerial vehicles.

BACKGROUND

Unmanned aerial vehicles (UAVs), commonly known as drones, are finding increased industry use Improvements in artificial intelligence, battery life, and computational power have each been contributing factors in this development. Currently, drones are used by a variety of entities, such as armed forces, police forces, corporations, individual operators, and the like.

Among their many uses, drones allow for efficient inspection of wide areas from versatile angles, convenient filming of elaborate movie scenes, securing of sensitive facilities, and the like. Unfortunately, it is currently relatively simple for a person with ordinary technical knowledge to use a laptop or similar computing device for sending drone instructions with malicious global navigation satellite system (GNSS) coordinates, thereby tricking the drone into believing that it is maintaining its original flight plan when in reality its intended destination has been compromised. This process is called GNSS spoofing and it is currently a rising issue in the field of drones.

GNSS spoofing is a problem that may cause damages in the magnitude of millions of dollars when considering the value of the spoofed drones that have been stolen, lost data from such drones, products that have been carried by spoofed drones, and the like. Moreover, the GNSS spoofing attacks threaten the security of civilians, countries, law enforcements and other entities employing drone use.

Certain solutions have been introduced to drone systems that allow for the identification of GNSS spoofing attacks on UAVs. Such solutions, however, are very expensive and require mounting components that can be physically difficult to be mounted on drones, such as for example, phased array antennas, which can increase the cost and inefficiencies of drone operation. Therefore, there is a need to overcome the deficiencies of these systems by providing an efficient solution that enables identification of GNSS spoofing attacks on drones.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for identifying global navigation satellite system (GNSS) spoofing attacks on a protected vehicle, where the method includes: identifying a plurality of characteristics associated with at least one GNSS signal; analyzing a plurality of characteristics of the at least one GNSS signal; determining, based on the analysis of the identified characteristics, whether the at least one GNSS signal is a spoofed signal.

Certain embodiments disclosed herein also include a system for detecting a global navigation satellite system (GNSS) spoofing attack on a protected vehicle, the system comprising: a processing circuitry; a plurality of GNSS antennas connected to a plurality of GNSS receivers, wherein each of the plurality of GNSS receivers is connected to the processing circuitry; a radio frequency (RF) absorber covering each of the plurality of GNSS antennas, wherein the RF absorber enables the plurality of GNSS antennas to identify a direction from which at least one GNSS signal is received; a memory coupled to the processing circuitry, the memory containing therein instructions that, when executed by the processing circuitry, configures the system to: identify a plurality of characteristics associated with the at least one GNSS signal; analyze the plurality of characteristics; determine, based on the analysis of the plurality of characteristics, whether the at least one GNSS signal is a spoofed signal.

BRIEF DESCRIPTION OF THE SEVERAL VIEWS OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
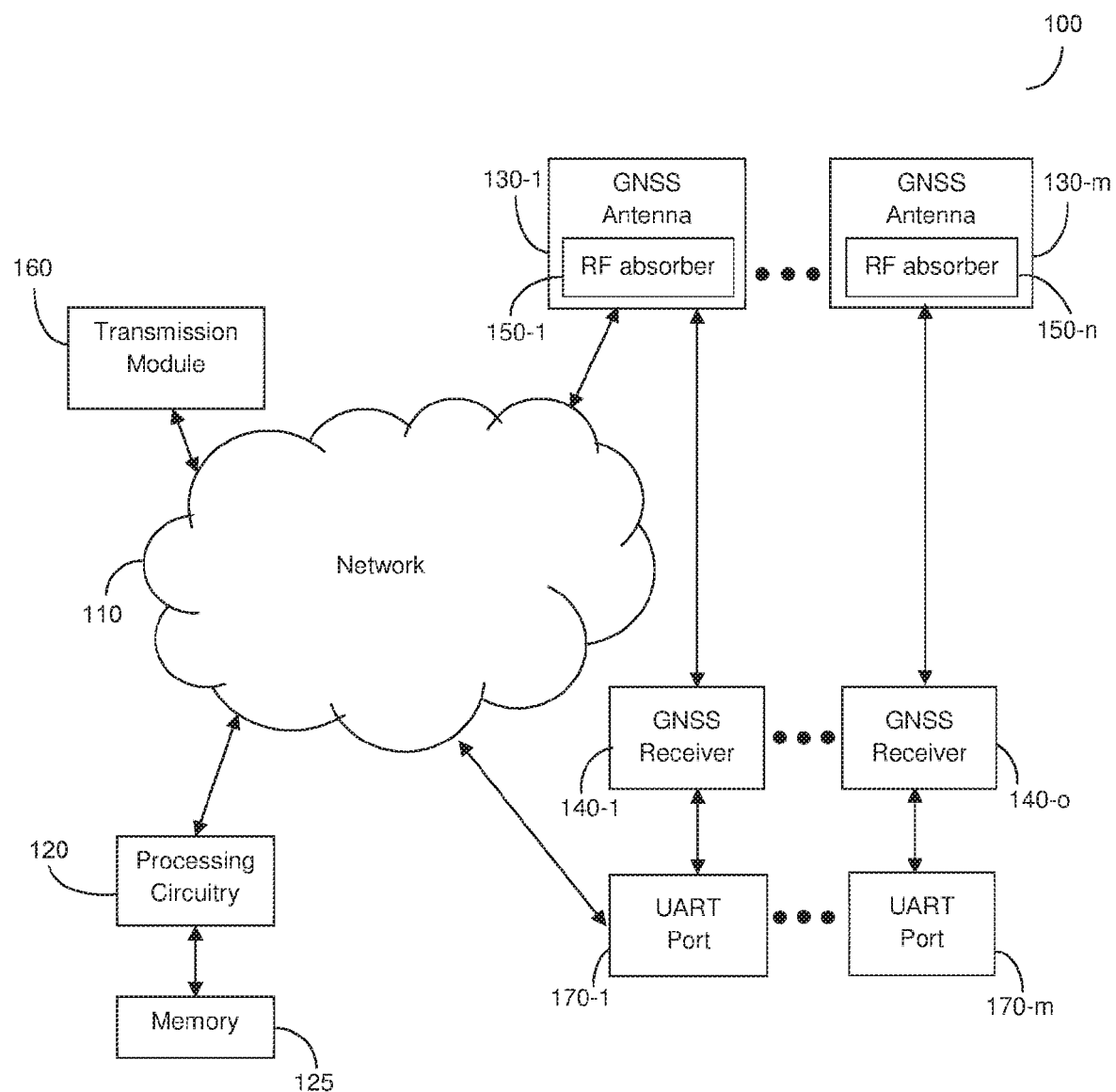
FIG. 1 is a block diagram of the system for identification of GNSS spoofing attacks on a protected vehicle, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for the identification of spoofing attacks on unmanned aerial vehicles. In an example embodiment, the system includes GNSS antennas mounted to various surfaces of a protected vehicle, such as for example, an unmanned aerial vehicle or a drone. Each of the GNSS antennas is connected to a GNSS receiver, which is connected to a processing circuitry. According to the disclosed embodiments, the GNSS antennas are covered with a radio frequency (RF) absorber wherein the RF absorber enables the GNSS antennas to identify a direction from which at least one GNSS signal is received. In an embodiment, the RF absorber causes the antennas to receive and transmit as directional antennas, namely an antenna configured to receive signals more effectively in a particular direction.

The system is configured to receive and analyze the GNSS signals to determine from which direction and by which of the GNSS antennas the GNSS signals are received. The system is further configured to determine whether the GNSS signals exceed predetermined thresholds of signal to noise ratio (SNR), and calculate the determined location of each of the GNSS receivers in order to determine if one signal differs from the others, in which case it may be designated as a suspected spoofed signal. In an embodiment, based on the determination, a notification indicating a detected GNSS spoofing attack is generated.

FIG. 1 is a block diagram of a system 100 utilized to describe the various embodiments for identification GNSS spoofing attacks on a protected vehicle according. GNSS may include any positioning system, such as GLONASS, Galileo, Beidou, and GPS. The system 100 includes a plurality of GNSS antennas 130-1 to 130-$m$, where 'm' is an integer equal to or greater than 1 (hereinafter referred to as 130 for simplicity) connected to a processing circuitry 120 via a network 110. The processing circuitry 120 is operably connected to a memory 125. The memory 125 contains therein instructions that when executed by the processing circuitry 120 configures the processing circuitry 120 to execute actions as further described herein below.

The processing circuitry 120 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-Chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory 515 may be volatile, non-volatile, or a combination thereof. The network 110 may be a cellular or wired network, a local area network (LAN), a wide area network (WAN), a metro area network (MAN), the Internet, the worldwide web (WWW), like networks, and any combination thereof.

A radio frequency (RF) absorber 150, i.e., RF absorbers 150-1 through 150-$n$ (hereinafter referred to as 150 for simplicity) covers each of the plurality of GNSS antennas 130. Each RF absorber 150 may be adapted to enable the plurality of GNSS antennas 130 to identify a direction from which at least one GNSS signal is received. The RF absorber 150 may be placed on one side of the plurality of GNSS antennas 150 in order to be very sensitive on that side only, i.e. detect only signals that were transmitted from a specific direction. The plurality of GNSS antennas may include for example, a patch antenna, a fractal element antenna (FEA), a chip antenna or a PCB antenna.

The GNSS receivers are configured to enable the processing circuitry 120 to identify characteristics associated with received GNSS signals transmitted by a known or an unknown source, without locking onto certain transmitted GNSS signals, or with delayed locking thereof. This enables a more effective method of identifying a spoofed signal, as one method of spoofing avoids detection by tracking legitimate signals and maintaining a similar signal lock throughout an attack, making it harder to detect the spoofed signal.

The plurality of GNSS antennas 130 are communicatively connected to at least one of a plurality of GNSS receivers 140-1 through 140-$o$ where 'o' is an integer having a value greater than 1 (hereinafter referred to as 140 for simplicity). In an embodiment, the GNSS antennas 130 are connected to the GNSS receiver 140 via a radio frequency (RF) cable. The RF cable allows each of the plurality of GNSS receivers 140 to receive from the at least one GNSS antennas 130 a plurality of GNSS signals transmitted by one or more sources, such as for example, satellites.

The plurality of GNSS receivers 140 are further operable in the identification of GNSS spoofs. In an embodiment, each of the plurality of GNSS receivers 140 is connected to the processing circuitry 120 via a universal asynchronous receiver transmitter (UART) port 170. In an embodiment, the UART port 170 is connected to the processing circuitry 120 via the network 110. The system 100 may comprise a plurality of UART ports 170, i.e., UART port 170-1 through 170-$p$ where 'p' is an integer greater than 1 (hereinafter referred to as 170 for simplicity). The UART port 170 is a computer hardware device connected in the system 100 and configured to receive GNSS signals from the GNSS receivers 140 and to transfer the GNSS signals to the processing circuitry 120. The plurality of GNSS receivers 140 may be configured to continuously search for GNSS signals transmitted by at least one source, as further described herein below.

A transmission module 160 may be further connected to the system 100, wherein the transmission module 160 is communicatively connected to the processing circuitry 120 via the network 110. The transmission module 160 may be configured to send, upon identification of a GNSS spoofing attack, an alert to a drone's flight controller (not shown). The drone's flight controller is an electronic component embedded within the drone used for executing processes, such as, for example, directing the drone through a specific flight path.

In an embodiment, at least one of the plurality of GNSS antennas 130 is mounted on an upper side of a drone, e.g., directed toward the sky, and at least one of the plurality of GNSS antennas 130 is mounted on a lower side of the drone, e.g., directed toward the ground. In a further embodiment, in addition to the plurality of GNSS antennas 130 that are mounted on the upper side and lower side of the drone, one or more GNSS antennas 130 may be mounted on the sides of the drone. The GNSS antennas 130 may additionally be mounted on the right and/or on the left side of the drone.

It should be appreciated that mounting the GNSS antennas 130 on many locations on the drone allows for the identification of the source from which a GNSS signal is received. The location(s) of each received signal can be determined based on the reception of the signal via the various antennas. If one antenna indicates a different source direction than the others, the received signal from that antenna may be labeled as spoofed signal.

The processing circuitry 120 may be configured to identify a plurality of characteristics associated with the GNSS signals. The plurality of characteristics may indicate on: a signal-to-noise ratio (SNR) associated with the one or more GNSS signals, lock times for identifying the drone's valid location, accuracy of the drone's location, which of the plurality of the GNSS antennas 130 has received the one or more GNSS signals, or any combination thereof.

The identification of the plurality of characteristics may be achieved subject to receiving, by the processing circuitry 120 from the plurality of GNSS receivers 140, digital messages that comprise metadata related to: signal-to-noise ratio (SNR), lock times, location data, location data accuracy, satellites' pseudorandom noise (PRN) number, elevation, azimuth, and the like. The digital messages may be generated by the GNSS receiver 140 upon processing the GNSS signal received from the RF absorber 150 and then sent to the processing circuitry 120, wherein the processing circuitry 120 is configured to identify the characteristics of the digital messages. The digital messages may be delivered using GNSS messaging protocols, such as for example, the National Maritime Electronics Association (NMEA) specification.

Based on the identification of the characteristics associated with the GNSS signals, the processing circuitry 120 may be configured to analyze the such characteristics. The analysis may include comparing the identified characteristics to data stored within the memory 125 or within an external database (not shown). Such data relates to the plurality of characteristics. For example, if one characteristic associated with lock times indicates that the GNSS signal was transmitted for 40 seconds, it may be compared to a predetermined lock time threshold of 30 seconds, related to the transmission time. According the example, a lock time threshold had been reached.

Based on the analysis of the plurality of characteristics, the processing circuitry 120 is configured to determine whether the calculated location of each of the GNSS receivers differ such that at least one of the plurality of GNSS signals was received from a source that differs from the rest of the GNSS signals' source. In an embodiment, this is accomplished by determining if the GNSS signal is received by one GNSS antenna before or after the other received GNSS signals are detected, which may indicate the presence of a spoofed signal, as the spoof point of origin will likely differ from a legitimate point of origin.

The processing circuitry 120 may be further configured to determine whether the one or more GNSS signals exceed a predetermined SNR threshold, accuracy threshold, lock times threshold, and the like. The SNR is the ratio of a signal's strength and a background noises. The predetermined SNR threshold may indicate a certain predetermined value of SNR such as for example, 15 decibels (dB), wherein the crossing above such a threshold may be used to indicate an unreliable source. For example, if a first signal is received by three antennas with an SNR below the threshold value, and a second signal is received by a fourth antenna with an SNR above the threshold value, it may be determined that the second signal is a spoofing signal, as a spoofed source may often be located closer to the GNSS receiver than a legitimate source (e.g., a satellite in orbit). The threshold may be adjusted, either automatically based on referencing a database, or manually via a user command.

According to the disclosed embodiments, the various locations of the plurality of GNSS antennas placed on the UAV are used to determine the locations of the source of received GNSS signals. The distances between the GNSS antennas mounted onto the UAV are taken into account when calculating the location of the signal source. For example, three GNSS antennas (e.g., A1, A2 and A3) mounted on the UAV may indicate that the location of the source of a received signal is "x", "x+y" and "x+z" from the UAV, respectively, where 'y' represents the distance between A1 and A2, and 'z' represents the distance between A1 and A3. It can then be determined that the antennas are detecting a signal from a single source. However, if a fourth antenna, e.g., A4, indicates a distance to the source of a signal as "x+w," where 'w' is not the distance between A1 and A4, it can be determined that the source of the signal detected by A4 differs from the source of the signal detected by A1, A2 and A3. This may be an indication of a spoofed GNSS signal. According to one embodiment, the processing circuitry 120 may use several measurements for calculating the accuracy of the location, such as, for example, horizontal dilution of precision (HDOP), vertical dilution of precision (VDOP), and the like.

The predetermined lock time threshold may include a certain predetermined value that indicates a certain time limit for the GNSS receiver 140 to report of a valid location. For example, if the lock time threshold is determined to be below 10 seconds and the GNSS receiver 140 identified a valid location after 7 seconds, the predetermined time lock threshold has been reached.

According to an embodiment, the processing circuitry 120 may be configured to generate a notification that indicates if a spoofing attack has been detected. The notification may be generated based on the determination that the origin of one or more GNSS signals differ from the origin of other GNSS signals, that the GNSS signals exceed the predetermined SNR, accuracy, lock times threshold, and so on. The notification may be sent by the processing circuitry 120 to a transmission module 160 via a wired or a wireless network 110. The network 110 may include for example Wi-Fi, 3G, 4G, GPRS, RF links, and the like that may be configured to send an alert to the drone's flight controller (not shown).

It should be appreciated that the processing circuitry 120 may be able to identify whether GNSS signals were received from a trustworthy source, e.g., a known satellite, by identifying the gap between the results of the calculation of the location of one GNSS receivers, and the result of the location calculation of a different GNSS receiver. This may be calculated from GNSS signals transmitted from satellites, reflected off the ground, and projected upward toward the sky, where each signal is received by the at least one GNSS antenna 130 mounted on the UAV. The plurality of characteristics associated with the GNSS signals may indicate the strength of the one or more GNSS signals and, based on the analysis, the processing circuitry 120 may determine that the transmission source is a trustworthy or non-trustworthy source.

In an embodiment, the plurality of RF absorbers 150 are configured to enable the GNSS antennas to become directional antennas, i.e., an antenna that identifies the direction of a received signal. The RF absorbers 150 may be placed on one side of each of the GNSS antennas to enable the detection of a specific signal transmission direction.

Figure 2:
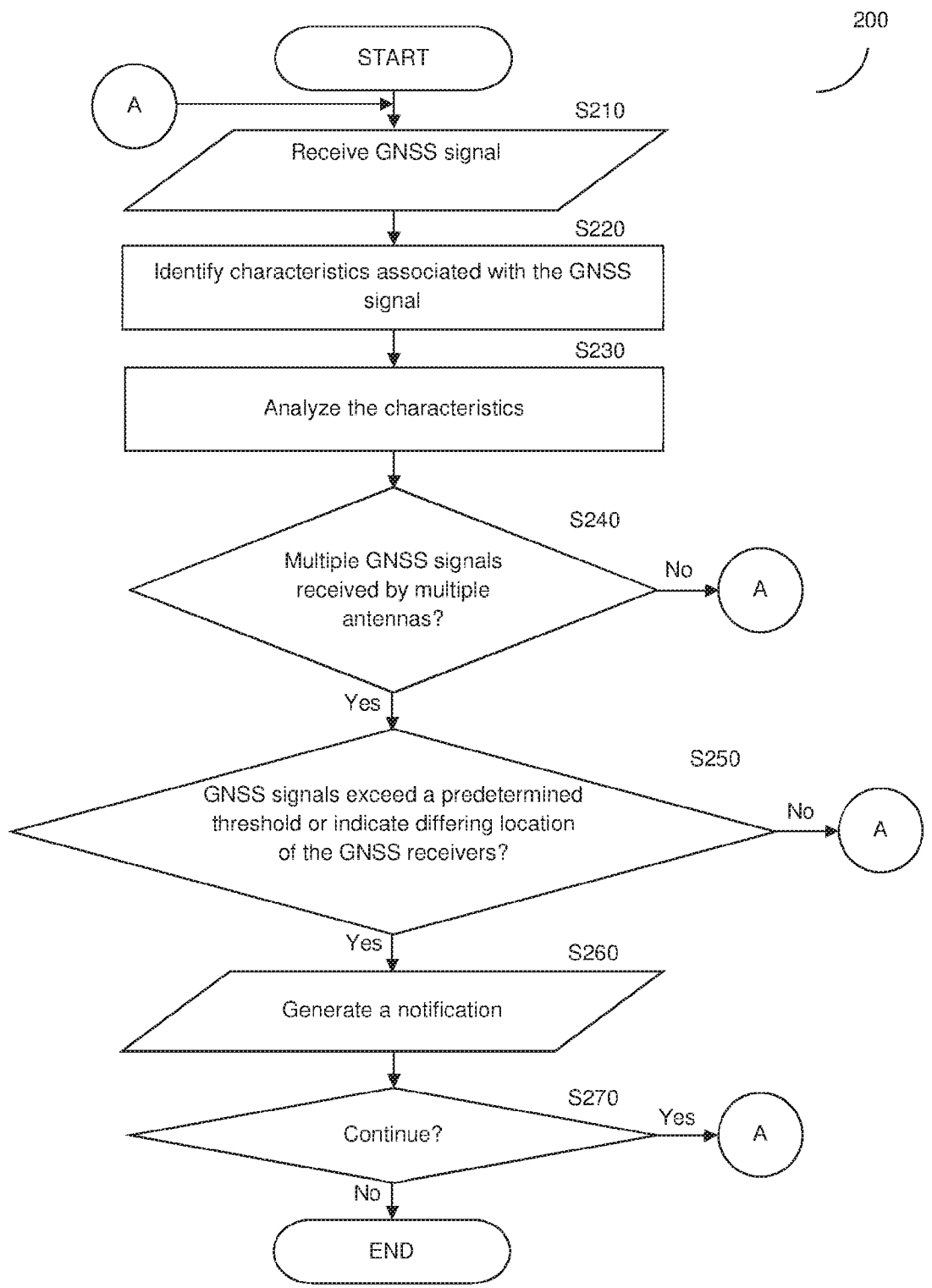
FIG. 2 is a flowchart illustrating a method for identifying GNSS spoofing attacks on a protected vehicle according to an embodiment.

FIG. 2 is a flowchart illustrating a method for identifying GNSS spoofing attacks on an unmanned aerial vehicle, such as a drone according to an embodiment. At S210, the operation starts when one or more GNSS signals are received, e.g., by the processing circuitry 120 of FIG. 1, from a radio frequency (RF) absorber, e.g., the RF absorber 150 disposed on the GNSS antenna 130. In an embodiment, a plurality of GNSS antennas are divided into at least two groups wherein at least one GNSS antenna is mounted on the upper side of a drone, and at least one GNSS antenna is mounted on the lower side of the drone. Receiving the GNSS signals may be achieved by using a plurality of GNSS receivers, e.g., as described in the system discussed in FIG. 1.

At S220, characteristics associated with the GNSS signals are identified. Such characteristics may indicate on: a signal-to-noise ratio (SNR) associated with the one or more GNSS signals, lock times for identifying the drone's valid location, accuracy of the drone's location, which of the plurality of the GNSS antennas had received the GNSS signals, and any disparity in the calculated location of the GNSS receivers based on the received GNSS signals.

At S230, the identified characteristics are analyzed to detect a potential GNSS spoofing attack.

At S240, is it determined whether the GNSS signals were received by at least two of the GNSS antennas 130 mounted on the drone. If so, execution resumes with S250; otherwise, execution continues with S210.

At S250, it is determined whether the received (at least two) GNSS signals exceed a predetermined threshold of SNR, accuracy, lock times, and the like as further described herein above with respect of FIG. 1. Additionally, it is determined if at least one GNSS signal indicates a point of origin differing from at least one other GNSS signal. If so, the execution resumes with optional S260; otherwise, execution continues with S210.

At optional S260, a notification is generated based on the determination that at least one GNSS signal exceeds the predetermined thresholds as further described herein above or is determined to originate from a source differing from the source of at least one other GNSS signal. At S270, it is checked whether to continue the operation and if so, execution continues with S210; otherwise, execution terminates.

Figure 3:
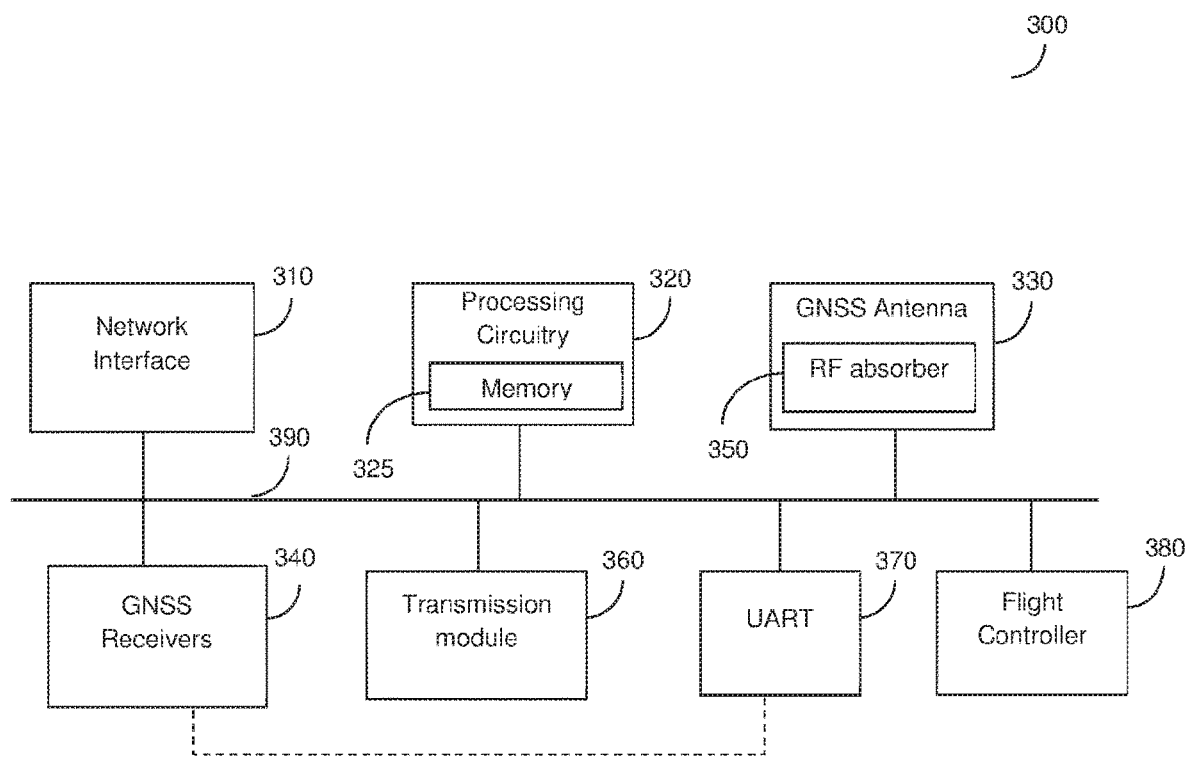
FIG. 3 is a schematic block diagram of the system embedded on a drone according to an embodiment.

FIG. 3 is a schematic block diagram of the system 300 embedded on a drone according to an embodiment. The various component of the system 300 may be connected via a bus 390. The system 300 includes a network interface 310 that allows communication with an end point device (not shown) such as a personal computer, laptop, smartphone, and similar computing devices. A processing circuitry 320 connected to a memory 325 is further connected to the system 300, wherein the memory contains therein instructions that, when executed by the processor, configures the system 300 to execute actions as further described herein above with respect to FIG. 1 and FIG. 2.

The system 300 further includes a plurality of GNSS antennas 330. The GNSS antennas 330 are connected to at least one of a plurality of GNSS receivers 340, e.g., via a radio frequency (RF) cable. The RF cable allows each of the plurality of GNSS receivers 340 to receive from the GNSS antennas 330 one or more GNSS signals transmitted by one or more sources, e.g., from satellites. The system 300 further comprises a plurality of radio frequency (RF) absorbers 350. In an embodiment, each of the plurality of RF absorbers 350 covers at least part of each of the plurality of GNSS antennas 330. Each RF absorber 350 may be adapted to determine the direction of origin of GNSS signals received by each of the plurality of GNSS antennas 330.

Each of the plurality of GNSS receivers 340 is communicatively connected to the processing circuitry 320, e.g., via a universal asynchronous receiver transmitter (UART) port 370. The system 300 may comprise a plurality of UART ports 370. The UART port 170 is a computer hardware device coupled to the system 300 and configured to receive one or more GNSS signals from the GNSS receivers 340 and to transfer the one or more GNSS signals to the processing circuitry 320. The plurality of GNSS receivers 340 may be configured to continuously search for GNSS signals transmitted by at least one source, as further described herein above with respect of FIG. 1.

A transmission module 360 may be further coupled to the apparatus 100. The transmission module 360 is an electronic device installed within the apparatus 100 and communicatively connected to the processing circuitry 320. The transmission module 360 may be adapted to send, upon identification of a GNSS spoofing attack, an alert to a drone's flight controller 380. The drone's flight controller 380 is an electronic component embedded within the drone using for executing processes, such as for example, directing the drone through a certain path. Alternatively, the transmission module 360 may be configured to send, upon identification of a GNSS spoofing attack, an alert to a user device, e.g., a smartphone, via the network interface 310.

In an embodiment, at least one of the plurality of GNSS antennas 330 is mounted on an upper side of the drone, facing the sky, and at least one of the plurality of GNSS antennas 330 is mounted on a lower side of the drone, facing the ground. In a further embodiment, in addition to the plurality of GNSS antennas 330 that are mounted on the upper side of the drone and on the lower side of the drone, one or more GNSS antennas 330 may be mounted on the right and/or the left side of the drone. The purpose of mounting the GNSS antennas 330 on the proposed locations on the drone is to allow identification of the source from which a GNSS signal was received, as further described herein above.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for detecting global navigation satellite navigation (GNSS) spoofing attacks, comprising:
   receiving, from at least one GNSS receiver, a plurality of digital messages comprising:
      respective signal-to-noise ratios of GNSS signals received from a plurality of satellites, and
      respective locations calculated from said GNSS signals; and
   determining whether at least one of said GNSS signals is spoofed based on a comparison of said respective signal-to-noise ratios to a predetermined threshold and an analysis of disparities between said respective locations;
   wherein said determining whether at least one of said GNSS signals is spoofed is further based on an analysis of lock time data included in said digital messages.

2. The method according to claim 1, wherein said at least one of said GNSS signals is determined to be spoofed when a respective SNR of said GNSS signal exceeds said predetermined threshold and there is a disparity between a respective location calculated from said GNSS signal and at least one other of said calculated locations.

3. The method according to claim 1, further comprising generating a notification when at least one of said GNSS signals is determined to be spoofed.

4. The method according to claim 1, further comprising sending an alert to a user device over a network when at least one of said GNSS signals is determined to be spoofed.

5. The method according to claim 1, further comprising identifying a direction from which a spoofed GNSS signal was received.

6. The method according to claim 1, wherein said determining whether at least one of said GNSS signals is spoofed is further based on an analysis of location data included in said digital messages.

7. The method according to claim 1, wherein said determining whether at least one of said GNSS signals is spoofed is further based on an analysis of location data accuracy information included in said digital messages.

8. The method according to claim 1, wherein said determining whether at least one of said GNSS signals is spoofed is further based on an analysis of satellite pseudorandom noise (PRN) numbers included in said digital messages.

9. The method according to claim 1, wherein said determining whether at least one of said GNSS signals is spoofed is further based on an analysis of elevation data included in said digital messages.

10. The method according to claim 1, wherein said determining whether at least one of said GNSS signals is spoofed is further based on an analysis of azimuth data included in said digital messages.

11. A method according to claim 1, wherein said digital messages are delivered using a GNSS messaging protocol.

12. A system for detecting global navigation satellite navigation (GNSS) spoofing attacks, comprising:
   a memory configured for storing instructions for execution by processing circuitry; and
   a processing circuitry associated with said memory, configured to execute said instructions to:
      receive a plurality of digital messages from at least one GNSS receiver, said digital messages comprising respective signal-to-noise ratios of GNSS signals received from a plurality of satellites and respective locations calculated from said received GNSS signals, and
      determine whether at least one of said received GNSS signals is spoofed based on a comparison of said respective signal-to-noise ratios to a predetermined threshold and an analysis of disparities between said respective locations;
   wherein said determining whether at least one of said GNSS signals is spoofed is further based on an analysis of lock time data included in said digital messages.

13. The system according to claim 12, wherein said at least one of said received GNSS signals is determined to be spoofed when a respective SNR of said GNSS signal exceeds said predetermined threshold and there is a disparity between a respective location calculated from said GNSS signal and at least one other of said calculated locations.

14. The system according to claim 12, wherein said processing circuitry is further configured to execute said instructions to generate a notification when at least one of said GNSS signals is determined to be spoofed.

15. The system according to claim 12, wherein said processing circuitry is further configured to execute said instructions to send an alert to a user device over a network when at least one of said GNSS signals is determined to be spoofed.

16. The system according to claim 12, wherein said processing circuitry is further configured to execute said instructions to identify a direction from which a spoofed GNSS signal was received.

17. The system according to claim 12, wherein said digital messages are delivered using a GNSS messaging protocol.

18. A non-transitory computer readable medium including instructions that, when executed by at least one processor, cause said at least one processor to perform operations comprising:
   inputting a plurality of digital messages comprising:
      respective signal-to-noise ratios of GNSS signals received from a plurality of satellites, and
      respective locations calculated from said GNSS signals; and
   determining whether at least one of said GNSS signals is spoofed based on a comparison of said respective signal-to-noise ratios to a predetermined threshold and an analysis of disparities between said respective locations;

wherein said determining whether at least one of said GNSS signals is spoofed is further based on an analysis of lock time data included in said digital messages.

19. The non-transitory computer readable medium according to claim 18, wherein said at least one of said GNSS signals is determined to be spoofed when a respective SNR of said GNSS signal exceeds said predetermined threshold and there is a disparity between a respective location calculated from said GNSS signal and at least one other of said calculated locations.

20. The non-transitory computer readable medium according to claim 18, wherein said operations further comprise generating a notification when at least one of said GNSS signals is determined to be spoofed.

\* \* \* \* \*